United States Patent
Ni et al.

(10) Patent No.: US 11,805,219 B2
(45) Date of Patent: Oct. 31, 2023

(54) IMAGE SPECIAL EFFECT PROCESSING METHOD AND APPARATUS, ELECTRONIC DEVICE AND COMPUTER-READABLE STORAGE MEDIUM

(71) Applicant: BEIJING BYTEDANCE NETWORK TECHNOLOGY CO., LTD., Beijing (CN)

(72) Inventors: Guangyao Ni, Beijing (CN); Shentao Wang, Beijing (CN); Hui Yang, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/632,229

(22) PCT Filed: Jul. 31, 2020

(86) PCT No.: PCT/CN2020/106237
§ 371 (c)(1),
(2) Date: Feb. 1, 2022

(87) PCT Pub. No.: WO2021/027597
PCT Pub. Date: Feb. 18, 2021

(65) Prior Publication Data
US 2022/0272280 A1    Aug. 25, 2022

(30) Foreign Application Priority Data
Aug. 9, 2019    (CN) .......................... 201910734932.1

(51) Int. Cl.
H04N 5/262    (2006.01)
(52) U.S. Cl.
CPC ......... *H04N 5/2624* (2013.01); *H04N 5/2621* (2013.01); *H04N 5/2628* (2013.01)

(58) Field of Classification Search
CPC ....... G06F 3/14; G06F 3/1423; H04N 5/2621; H04N 5/2624; H04N 5/2628; H04N 5/262
See application file for complete search history.

(56) References Cited

U.S. PATENT DOCUMENTS 6,204,887 B1    3/2001    Hiroi
6,700,625 B1    3/2004    Fujii
(Continued)

FOREIGN PATENT DOCUMENTS

CN    104159151 A    *    11/2014
CN    104159151 A        11/2014
(Continued)

OTHER PUBLICATIONS

International Patent Application No. PCT/CN2020/106237; Int'l Search Report; dated Nov. 2, 2020; 2 pages.

*Primary Examiner* — Antoinette T Spinks
(74) *Attorney, Agent, or Firm* — BakerHostetler

(57) ABSTRACT

A method and a device for performing special effect processing on an image, an electronic apparatus, and a computer-readable storage medium are provided. The method includes: acquiring a video; capturing an image from the video by an image capture unit of a rendering layer when the video is played, and storing the captured image in a data storage layer; acquiring multiple images from the data storage layer by an image acquisition unit of the rendering layer; performing split-screen processing on the multiple images by a special effect unit of the rendering layer; and outputting an image obtained from split-screen processing and displaying the image obtained from split-screen processing on a terminal screen.

13 Claims, 2 Drawing Sheets

(56) References Cited

U.S. PATENT DOCUMENTS

| | | | |
|---|---|---|---|
| 11,303,871 B2 * | 4/2022 | Kim | H04N 21/816 |
| 2002/0031333 A1 | 3/2002 | Mano et al. | |
| 2015/0281638 A1 * | 10/2015 | Miyauchi | H04N 5/45 |
| | | | 348/445 |
| 2017/0154452 A1 | 6/2017 | Ishizu et al. | |
| 2018/0359444 A1 | 12/2018 | Milton et al. | |
| 2019/0141085 A1 | 5/2019 | Tsaplin et al. | |

FOREIGN PATENT DOCUMENTS

| | | | | |
|---|---|---|---|---|
| CN | 106331435 A | | 1/2017 | |
| CN | 108010037 A | | 5/2018 | |
| CN | 109032470 A | | 12/2018 | |
| CN | 109144384 A | * | 1/2019 | ......... G06F 3/04886 |
| CN | 109144384 A | | 1/2019 | |
| CN | 109218802 A | | 1/2019 | |
| CN | 110012352 A | | 7/2019 | |
| JP | 2018-519769 A | | 7/2018 | |

\* cited by examiner

IMAGE SPECIAL EFFECT PROCESSING METHOD AND APPARATUS, ELECTRONIC DEVICE AND COMPUTER-READABLE STORAGE MEDIUM

CROSS-REFERENCE TO RELATED APPLICATION

The present application is the national phase of International Patent Application No. PCT/CN2020/106237, titled "IMAGE SPECIAL EFFECT PROCESSING METHOD AND APPARATUS, ELECTRONIC DEVICE AND COMPUTER-READABLE STORAGE MEDIUM", filed on Jul. 31, 2020, which claims priority to Chinese Patent Application No. 201910734932.1, titled "IMAGE SPECIAL EFFECT PROCESSING METHOD AND APPARATUS, ELECTRONIC DEVICE AND COMPUTER-READABLE STORAGE MEDIUM", filed on Aug. 9, 2019 with the China National Intellectual Property Administration, both of which are incorporated herein by reference in their entireties its entirety.

FIELD

The present disclosure relates to the technical field of special effect processing for images, and in particular to a method and a device for performing special effect processing on an image, an electronic apparatus, and a computer-readable storage medium.

BACKGROUND

With the development of smart terminal technology, functions of smart terminals are increasingly diverse. For example, a user can use a camera of a terminal to take images (for example, photos or videos), which has become a new mode of entertainment for people. However, shooting images cannot meet the needs of users. How to perform special effect processing on the captured images to acquire fun and interesting images has become the focus of attention.

In the conventional technology, the captured images are usually post-produced to obtain images with special effects, which is not real-time and cannot perform special effect processing on an input image in real time. Alternatively, developers write programs for each special effect, which is inflexible. In addition, multiple implementations are required in order to achieve multiple special effects, which results in a large program, complicated implementation, and is time-consuming and labor-intensive.

SUMMARY

The summary is provided to introduce concepts in a brief form, and these concepts will be described in detail in the following specific embodiments. This summary is neither intended to indicate key or essential features of the technical solutions that are requested to be protected, nor intended to limit the scope of the technical solutions that are requested to be protected.

A method for performing special effect processing on an image is provided according to the present disclosure, so as to at least partially solve the technical problems of complicated and inflexible implementation of image special effects in the conventional technology. In addition, a device for performing special effect processing on an image, a hardware device for performing special effect processing on an image, a computer-readable storage medium, and a terminal for performing special effect processing on an image are further provided.

In order to achieve the above objective, the following technical solutions are provided according to an aspect of the present disclosure. A method for performing special effect processing on an image includes: acquiring a video; capturing an image from the video by an image capture unit of a rendering layer when the video is played, and storing the captured image in a data storage layer; acquiring multiple images from the data storage layer by an image acquisition unit of the rendering layer; performing split-screen processing on the multiple images by a special effect unit of the rendering layer; and outputting an image obtained from split-screen processing and displaying the image obtained from split-screen processing on a terminal screen.

In order to achieve the above objective, the following technical solutions are provided according to an aspect of the present disclosure. A device for performing special effect processing on an image includes: a video acquisition module, an image storage module, an image acquisition module, a split-screen processing module, and an image display module. The video acquisition module is configured to acquire a video. The image storage module is configured to capture an image from the video via an image capture unit of a rendering layer when the video is played, and store the captured image in a data storage layer. The image acquisition module is configured to acquire multiple images from the data storage layer via an image acquisition unit of the rendering layer. The split-screen processing module is configured to perform split-screen processing on the multiple images via a special effect unit of the rendering layer. The image display module is configured to output the image obtained from split-screen processing and display the image obtained from split-screen processing on a terminal screen.

In order to achieve the above objective, the following technical solutions are provided according to an aspect of the present disclosure. An electronic apparatus includes a memory and a processor. The memory is configured to store non-transitory computer-readable instructions. The processor is configured to execute the computer-readable instructions to implement the method for performing special effect processing on an image as described in the above aspect.

In order to achieve the above objective, the following technical solutions are provided according to an aspect of the present disclosure. A computer-readable storage medium is configured to store non-transitory computer-readable instructions that, when being executed by a computer, cause the computer to implement the method for performing special effect processing on an image as described in the above aspect.

In order to achieve the above objective, the following technical solutions are provided according to an aspect of the present disclosure. A terminal for performing special effect processing on an image includes the device for performing special effect processing on an image as described in the above aspect.

In the embodiments of the present disclosure, the image capture unit of the rendering layer captures an image from a video and stores the captured image in the data storage layer. The image acquisition unit of the rendering layer acquires multiple images from the data storage layer. The special effect unit of the rendering layer performs split-screen processing the multiple images. The image obtained from split-screen processing are outputted and displayed on the terminal screen. In this way, special effects can be accomplished by only modifying the rendering layer, which is relatively simple and flexible for implementation.

The above description is only an overview of the technical solutions of the present disclosure. In order to have a clearer understanding of the technical means of the present disclosure so that the technical solutions can be implemented in accordance with the specification, and to make the above and other objectives, features and advantages of the present disclosure understandable, the preferred embodiments are described in detail below in conjunction with the accompanying drawings.

BRIEF DESCRIPTION OF THE DRAWINGS

The above and other features, advantages, and aspects of the embodiments of the present disclosure will become more apparent in conjunction with the accompanying drawings and with reference to the following specific implementations. Throughout the drawings, the same or similar reference signs indicate the same or similar elements. It should be understood that the drawings are illustrative and components and elements are unnecessarily drawn to scale.

DETAILED DESCRIPTION OF EMBODIMENTS

Figure 1:
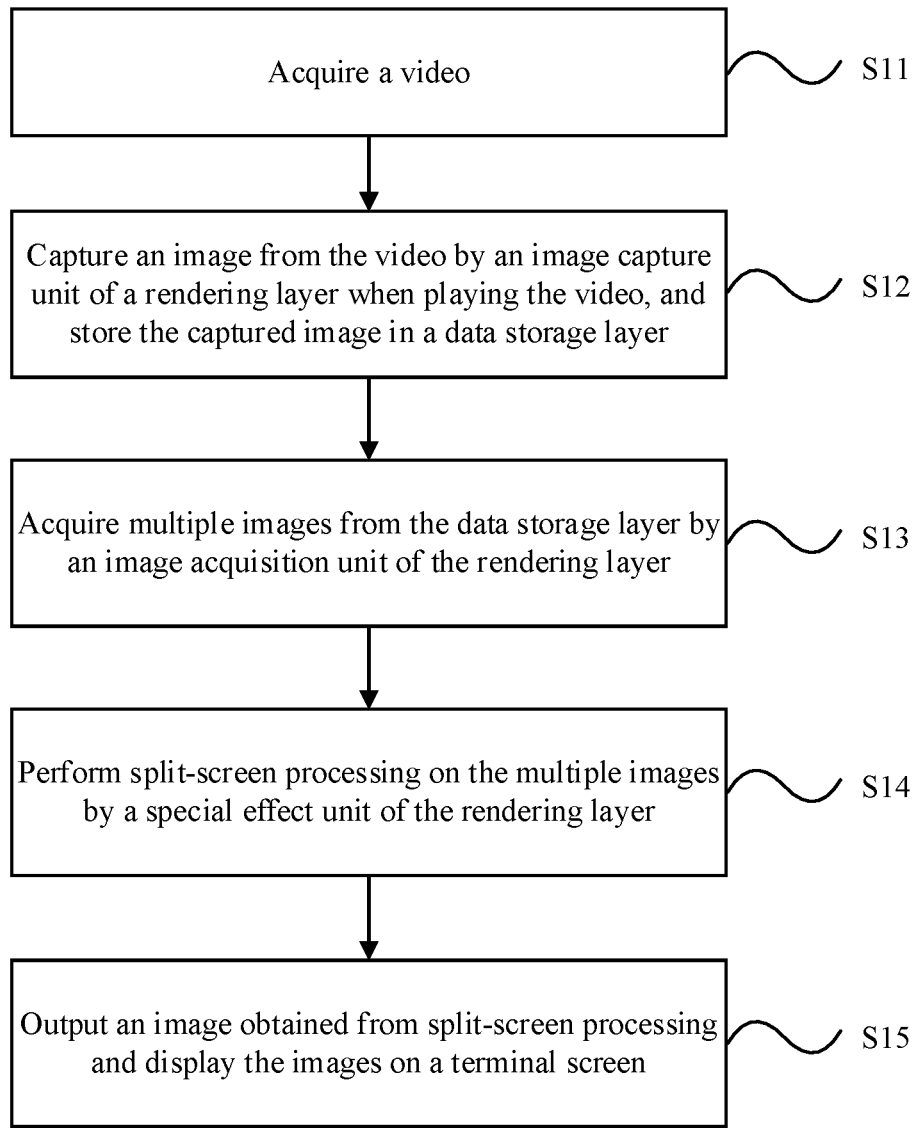
FIG. 1 is a schematic flowchart of a method for performing special effect processing on an image according to an embodiment of the present disclosure.

Hereinafter, embodiments of the present disclosure are described in more detail with reference to the accompanying drawings. Although some embodiments of the present disclosure are shown in the drawings, it should be understood that the present disclosure can be implemented in various forms and should not be construed as being limited to the embodiments set forth herein. Instead, these embodiments are provided for a more thorough and complete understanding of the present disclosure. It should be understood that the drawings and embodiments of the present disclosure are only for illustration, and are not intended to limit the protection scope of the present disclosure.

It should be understood that the various steps recorded in the method embodiment of the present disclosure may be performed in a different order, and/or performed in parallel. In addition, the method embodiment may include additional steps and/or omitted steps. The scope of the present disclosure is not limited in this respect.

The term "including" and its variations as used herein indicate open-ended inclusion, that is, "including but not limited to". The term "based on" means "based at least in part on". The term "an embodiment" means "at least one embodiment". The term "another embodiment" means "at least one additional embodiment". The term "some embodiments" means "at least some embodiments". Definitions of other terms will be given in the following description.

First Embodiment

In order to solve the technical problems of complicated and inflexible implementation of image special effects in the conventional technology, a method for performing special effect processing on an image is provided according to the embodiment of the present disclosure. As shown in FIG. 1, the method for performing special effect processing on an image includes the following steps S11 to S15.

In step S11, a video is acquired.

The video may be a video stream inputted in real time, for example, a live video in a short video application. Alternatively, the video may be pre-stored in a terminal. The terminal may be a mobile terminal such as a smartphone, a tablet computer, or a fixed terminal such as a desktop computer.

In step S12, when playing the video, an image capture unit of a rendering layer captures an image from the video and stores the captured image in a data storage layer.

The data storage layer is configured to store a captured image. For example, the data storage layer includes a cache, and the captured image is temporarily stored in the cache so that the captured image is stored and acquired quickly.

In step S13, an image acquisition unit of the rendering layer acquires multiple images from the data storage layer.

The data storage layer is configured to store a historical image. For example, the data storage layer includes a cache, and the historical image is temporarily stored in the cache so that the historical image is stored and acquired quickly.

In step S14, a special effect unit of the rendering layer performs split-screen processing on the multiple images.

According to a time sequence of the multiple images, the multiple images are arranged in a blank image. For example, the blank image is divided into regions according to the number of the multiple images. Then, the multiple images are drawn in respective regions according to the time sequence, and then combined into an image. If there are 9 acquired images, the blank image is divided into 9 grid regions in 3 rows and 3 columns. The 9 images are drawn in the respective grid regions according to the time sequence from top to bottom and left to right, and then combined into an image.

In step S15, an image obtained from split-screen processing are outputted and displayed on a terminal screen.

In this embodiment, the image capture unit of the rendering layer captures an image from a video and stores the captured image in the data storage layer. The image acquisition unit of the rendering layer acquires multiple images from the data storage layer. The special effect unit of the rendering layer performs split-screen processing on the multiple images. The image obtained from split-screen processing are outputted and displayed on the terminal screen. In this way, special effects can be accomplished by only modifying the rendering layer, which is relatively simple and flexible for implementation.

In an alternative embodiment, the step S13 includes: acquiring, via the image acquisition unit of the rendering layer, k images at a time interval of n from a cache with a total capacity of k*n in the data storage layer, where k is a positive integer greater than 1, and n is a positive integer.

In a case that the cache in the data storage layer has a total capacity of 9*10, 9 images among stored images are acquired at a time interval of 10 s according to the time sequence.

In an alternative embodiment, the method further includes: sending an image acquisition instruction to the image acquisition unit of the rendering layer via a script layer, to trigger the image acquisition unit.

The script layer includes script programs and script files required for running the script programs. The rendering layer is controlled by setting logic in a script. For example, the image acquisition instruction is sent to the image acquisition unit of the rendering layer, so that the image acquisition unit acquires a historical image of the video from the data storage layer in response to the image acquisition instruction.

In an alternative embodiment, the method further includes: sending a control instruction to the special effect unit of the rendering layer via the script layer, to trigger the special effect unit.

The rendering layer is controlled by setting logic in a script. For example, a special effect is completed by controlling the special effect unit of the rendering layer. That is, the control instruction is sent to the special effect unit of the rendering layer, and the special effect unit superimposes the historical image and a current image in response to the control instruction.

In an alternative embodiment, the method further includes: sending an image capture instruction to the image capture unit of the rendering layer via the script layer, to trigger the image capture unit.

The rendering layer is controlled by setting logic in a script. For example, the image capture instruction is sent to the image capture unit of the rendering layer via the script layer, so that the image capture unit captures an image in response to the capture instruction, and caches the captured image in the storage layer.

In addition, the image capture instruction includes at least one of the following parameters: an image identification, image coordinates, an image width, an image height, resolution of the terminal screen, and the number of split screens.

The image identification is a serial number or a name of the captured image, and may be randomly generated when the image is captured.

The image coordinates are start and end coordinates of the captured image, including x and y coordinates. For example, the image coordinates include the coordinates of the upper left corner and the lower right corner of the terminal screen. The image coordinates may specifically be normalized coordinates. In the case of normalized coordinates, actual coordinates are calculated according to resolution of the terminal screen. For example, a product of the normalized coordinates and the resolution of the terminal screen serves as the actual coordinates.

The image width is the width of the captured image.

The image height is the height of the captured image.

Those skilled in the art should understand that, modifications (for example, combining the listed modes) or equivalent substitutions may be made on the above various embodiments.

In the above, the steps in the embodiment of the method for performing special effect processing on an image are described in the order described above. It should be clear to those skilled in the art that the steps in the embodiments of the present disclosure are unnecessarily performed in the above order, but may be performed in other orders such as in reverse, in parallel, and alternately. Moreover, on the basis of the above steps, those skilled in the art may add other steps, and these modifications or equivalent substitutions should also be included in the protection scope of the present disclosure, and are not described in detail herein.

The device embodiment according to the present disclosure is described below. The device according to the present disclosure is configured to perform the steps in the method embodiment of the present disclosure. For ease of description, only the parts related to the embodiments of the present disclosure are shown. For specific technical details that are not disclosed, reference is made to the method embodiment of the present disclosure.

Second Embodiment

Figure 2:
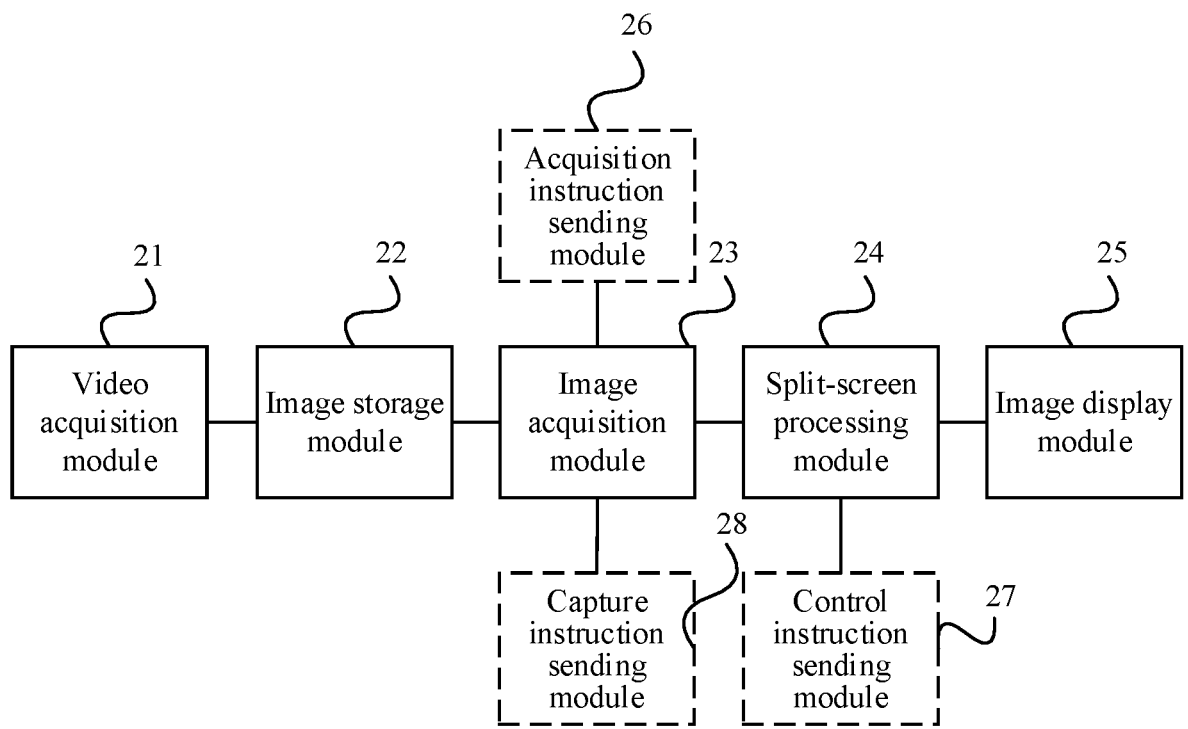
FIG. 2 is a schematic flowchart showing processing performed by a device for performing special effect processing on an image according to an embodiment of the present disclosure.

In order to solve the technical problems of complicated and inflexible implementation of image special effects in the conventional technology, a device for performing special effect processing on an image is provided according to the embodiment of the present disclosure. The device is configured to perform the steps of the method for performing special effect processing on an image as described in the first embodiment. As shown in FIG. 2, the device includes a video acquisition module 21, an image storage module 22, an image acquisition module 23, a split-screen processing module 24, and an image display module 25.

The video acquisition module 21 is configured to acquire a video.

The image storage module 22 is configured to capture an image from the video via an image capture unit of a rendering layer when the video is played, and store the captured image in a data storage layer.

The image acquisition module 23 is configured to acquire multiple images from the data storage layer via an image acquisition unit of the rendering layer.

The split-screen processing module 24 is configured to perform split-screen processing on the multiple images via a special effect unit of the rendering layer.

The image display module 25 is configured to output an image obtained from split-screen processing and display the image obtained from split-screen processing on a terminal screen.

In addition, the image acquisition module 23 is configured to acquire, via the image acquisition unit of the rendering layer, k images at a time interval of n from a cache with a total capacity of k*n in the data storage layer, where k is a positive integer greater than 1, and n is a positive integer.

In addition, the device further includes an acquisition instruction sending module 26. The acquisition instruction sending module 26 is configured to send an image acquisition instruction to the image acquisition unit of the rendering layer via a script layer, to trigger the image acquisition unit.

In addition, the device further includes a control instruction sending module 27. The control instruction sending module 27 is configured to send a control instruction to the special effect unit of the rendering layer via the script layer, to trigger the special effect unit.

In addition, the device further includes a capture instruction sending module 28. The capture instruction sending module 28 is configured to send an image capture instruction to the image capture unit of the rendering layer via the script layer, to trigger the image capture unit.

In addition, the image capture instruction includes at least one of the following parameters: an image identification, image coordinates, an image width, an image height, resolution of the terminal screen, and the number of split screens.

For detailed descriptions of the operation principle and technical effects of the embodiment of the device for performing special effect processing on an image, reference is made to the relevant description in the above embodiments of the method for performing special effect processing on an image. Therefore, the operation principle and technical effects of the embodiment of the device for performing special effect processing on an image are not described in detail herein.

Third Embodiment

Figure 3:
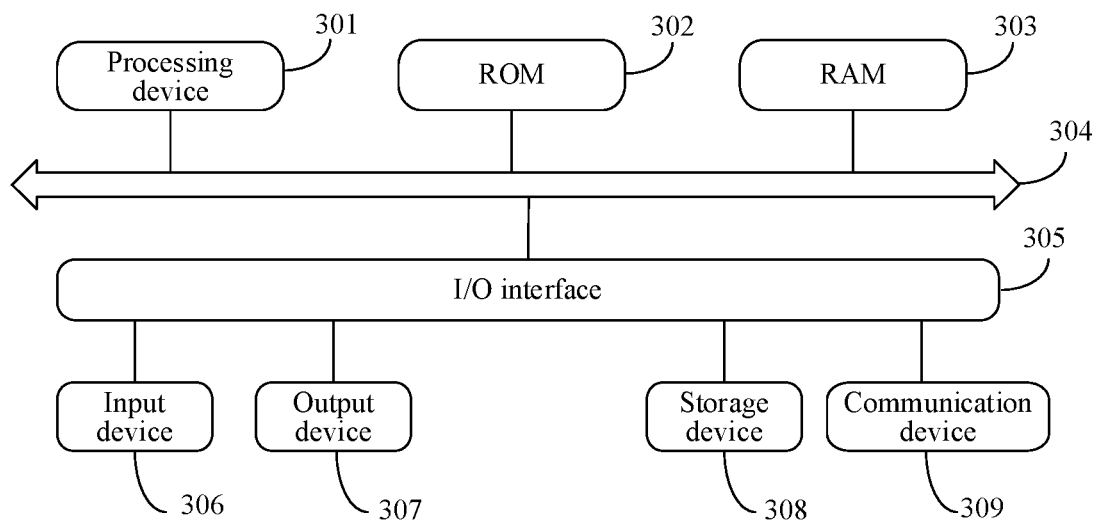
FIG. 3 is a schematic structural diagram of an electronic apparatus according to an embodiment of the present disclosure.

Reference is made to FIG. 3, which is a schematic structural diagram of an electronic apparatus 300 for implementing the embodiments of the present disclosure. The terminal apparatus according to the embodiment of the present disclosure may include, but is not limited to, a mobile terminal such as a mobile phone, a notebook computer, a digital broadcast receiver, a PDA (personal digital assistant), a PAD (tablet), a PMPs (portable multimedia player), a vehicle-mounted terminal (such as a vehicle navigation terminal) and the like, and a fixed terminal such as a digital TV, a desktop computer and the like. The electronic apparatus shown in FIG. 3 is only an example, and should not bring any limitation to the function and scope of use of the embodiments of the present disclosure.

As shown in FIG. 3, the electronic apparatus 300 includes a processing device (for example, a central processing unit, a graphics processing unit or the like) 301. The processing device 301 performs various appropriate actions and processing in accordance with a program stored in a read only memory (ROM) 302 or a program loaded from a storage device 306 into a random-access memory (RAM) 303. Various programs and data required for the operation of the electronic apparatus 300 are also stored in the RAM 303. The processing device 301, the ROM 302, and the RAM 303 are connected to each other via a bus 304. An input/output (I/O) interface 305 is also connected to the bus 304.

Generally, the following devices are connected to the I/O interface 305: an input device 306 including a touch screen, a touch pad, a keyboard, a mouse, a camera, a microphone, an accelerometer, a gyroscope or the like; an output device 307 including a liquid crystal display (LCD), a speaker, a vibrator or the like; a storage device 306 including a magnetic tape, a hard disk or the like; and a communication device 309. The electronic apparatus 300 performs wireless or wired communication with another apparatus via the communication device 309 to exchange data. Although FIG. 3 shows an electronic apparatus 300 having various devices, it should be understood that it is unnecessarily to implement or have all of the illustrated devices. It may alternatively be implemented or provided with more or fewer devices.

In particular, according to an embodiment of the present disclosure, the process described above with reference to the flowchart may be implemented as a computer software program. For example, a computer program product is provided according to an embodiment of the present disclosure. The computer program product includes a computer program carried on a non-transitory computer-readable medium, and the computer program includes program code for performing the method shown in the flowchart. In this embodiment, the computer program may be downloaded and installed from the network, or installed from the storage device 306, or installed from the ROM 302 via the communication device 309. When the computer program is executed by the processing device 301, the above functions defined in the method according to the embodiment of the present disclosure are implemented.

It should be noted that the above computer-readable medium in the present disclosure may be a computer-readable signal medium or a computer-readable storage medium, or any combination of the computer-readable signal medium and the computer-readable storage medium. The computer-readable storage medium includes, for example, but is not limited to, an electrical, magnetic, optical, electromagnetic, infrared, or semiconductor system, device, or component, or a combination of any of the above. More specific examples of the computer-readable storage medium may include, but are not limited to: electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program, and the program may be used by or in combination with an instruction execution system, apparatus, or device. In the present disclosure, the computer-readable signal medium may include a data signal propagated in a baseband or as a part of a carrier wave, and the data signal carries a computer-readable program code. This propagated data signal may be in various forms, including but not limited to an electromagnetic signal, an optical signal, or any suitable combination of the electromagnetic signal and the optical signal. The computer-readable signal medium may also be any computer-readable medium other than the computer-readable storage medium. The computer-readable signal medium may send, propagate, or transmit the program for being used by or in combination with the instruction execution system, apparatus, or device. The program code included in the computer-readable medium may be transmitted via any suitable medium, including but not limited to a wire, an optical cable, RF (radio frequency), or any suitable combination of the above.

In some embodiments, a client and a server can perform communications based on any currently known or future developed network protocol such as HTTP (Hyper Text Transfer Protocol), and can communicate with any form or medium of digital data (for example, communication network). The communication network includes a local area network ("LAN"), a wide area network ("WAN"), network in network (for example, the Internet), and an end-to-end network (for example, the ad hoc end-to-end network), as well as any network currently known or developed in the future.

The above computer-readable medium may be included in the above electronic apparatus or may exist independently without being assembled into the electronic apparatus.

The above computer-readable medium carries one or more programs. When executing the one or more programs mentioned above, the electronic apparatus: acquires a video; captures an image from the video via an image capture unit of a rendering layer when the video is played, and stores the captured image in a data storage layer; acquires multiple images from the data storage layer via an image acquisition unit of the rendering layer; performs split-screen processing on the multiple images via a special effect unit of the rendering layer; and outputs an image obtained from split-screen processing and displays the image obtained from split-screen processing on a terminal screen.

The computer program code for performing the operations of the present disclosure may be written in one or more programming languages or a combination thereof. The above programming languages include, but are not limited to, object-oriented programming languages-such as Java, Smalltalk, C++, and conventional procedural programming languages such as "C" language or similar programming languages. The program code may be executed entirely on a user computer, partly executed on the user computer, executed as an independent software package, partly executed on the user computer and partly executed on a remote computer, or entirely executed on a remote computer or a server. In the case of a remote computer, the remote computer may be connected to the user computer via any network, including a local area network (LAN) or a wide area network (WAN). Alternatively, the remote computer is connected to an external computer (for example, via the Internet provided by an Internet service provider).

The flowcharts and block diagrams in the accompanying drawings illustrate the possible implementation architecture, functions, and operations of the system, method, and computer program product according to various embodiments of the present disclosure. In this regard, each block in the flowchart or block diagram may represent a module, program segment, or part of code. The module, program segment, or part of the code contains one or more executable instructions for realizing a specified logic function. It should also be noted that, in some alternative implementations, the functions marked in the blocks may also occur in a different order from the order marked in the drawings. For example, two blocks shown in succession may be performed in parallel, or may be performed in a reverse order, depending on the functions involved. It should also be noted that each block in the block diagram and/or flowchart, and the combination of the blocks in the block diagram and/or flowchart, may be implemented by a dedicated hardware-based system that performs the specified functions or operations, or may be implemented by a combination of dedicated hardware and computer instructions.

The units involved in the embodiments described in the present disclosure may be implemented in software or hardware. The name of the unit under certain circumstances does not constitute a limitation on the unit itself. For example, the first acquisition unit may also be described as "a unit for acquiring at least two internet protocol addresses."

The functions described above may be performed at least in part by one or more hardware logic components. For example, without limitation, exemplary hardware logic components that can be used include: a field programmable gate array (FPGA), an application specific integrated circuit (ASIC), an application specific standard product (ASSP), a system on chip (SOC), a complex programmable logical device (CPLD) and so on.

In the context of the present disclosure, a machine-readable medium may be a tangible medium, and contains or stores a program for being used by or in combination with the instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, devices, or apparatus, or any suitable combination of the above. More specific examples of the machine-readable storage medium include electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

A method for performing special effect processing on an image is provided according to one or more embodiments of the present disclosure. The method includes: acquiring a video; capturing an image from the video via an image capture unit of a rendering layer when the video is played, and storing the captured image in a data storage layer; acquiring multiple images from the data storage layer via an image acquisition unit of the rendering layer; performing split-screen processing on the multiple images via a special effect unit of the rendering layer; and outputting the image obtained from split-screen processing and displaying the image obtained from split-screen processing on a terminal screen.

In addition, the acquiring multiple images from the data storage layer by an image acquisition unit of the rendering layer includes: acquiring, by the image acquisition unit of the rendering layer, k images at a time interval of n from a cache with a total capacity of k*n in the data storage layer, where k is a positive integer greater than 1, and n is a positive integer.

In addition, the method further includes: sending an image acquisition instruction to the image acquisition unit of the rendering layer via a script layer, to trigger the image acquisition unit.

In addition, the method further includes: sending a control instruction to the special effect unit of the rendering layer via the script layer, to trigger the special effect unit.

In addition, the method further includes: sending an image capture instruction to the image capture unit of the rendering layer via the script layer, to trigger the image capture unit.

In addition, the image capture instruction includes at least one of the following parameters: an image identification, image coordinates, an image width, an image height, resolution of the terminal screen, and the number of split screens.

A device for performing special effect processing on an image is provided according to one or more embodiments of the present disclosure. The device includes: a video acquisition module, an image storage module, an image acquisition module, a split-screen processing module, and an image display module. The video acquisition module is configured to acquire a video. The image storage module is configured to capture an image from the video via an image capture unit of a rendering layer when the video is played, and store the captured image in a data storage layer. The image acquisition module is configured to acquire multiple images from the data storage layer via an image acquisition unit of the rendering layer. The split-screen processing module is configured to perform split-screen processing on the multiple images via a special effect unit of the rendering layer. The image display module is configured to output an image obtained from split-screen processing and display the image obtained from split-screen processing on a terminal screen.

In addition, the image acquisition module is configured to acquire, via the image acquisition unit of the rendering layer, k images at a time interval of n from a cache with a total capacity of k*n in the data storage layer, where k is a positive integer greater than 1, and n is a positive integer.

In addition, the device further includes an acquisition instruction sending module. The acquisition instruction sending module is configured to send an image acquisition instruction to the image acquisition unit of the rendering layer via a script layer, to trigger the image acquisition unit.

In addition, the device further includes a control instruction sending module. The control instruction sending module is configured to send a control instruction to the special effect unit of the rendering layer via the script layer, to trigger the special effect unit.

In addition, the device further includes a capture instruction sending module. The capture instruction sending module is configured to send an image capture instruction to the image capture unit of the rendering layer via the script layer, to trigger the image capture unit.

In addition, the image capture instruction includes at least one of the following parameters: an image identification, image coordinates, an image width, an image height, resolution of the terminal screen, and the number of split screens.

An electronic apparatus is provided according to one or more embodiments of the present disclosure. The electronic apparatus includes a memory and a processor. The memory is configured to store non-transitory computer-readable instructions. The processor is configured to execute the computer-readable instructions to implement the method for performing special effect processing on an image as described above.

A computer-readable storage medium is provided according to one or more embodiments of the present disclosure. The computer-readable storage medium is configured to store non-transitory computer-readable instructions that, when being executed by a computer, cause the computer to implement the method for performing special effect processing on an image as described above.

Only preferred embodiments of the present disclosure and an explanation of the applied technical principles are described above. Those skilled in the art should understand that the scope of disclosure involved in this specification is not limited to the technical solutions formed by the specific combination of the above technical features, and should also cover other technical solutions formed by any combination of the above technical features or their equivalent features without departing from the above disclosed concept. For example, the scope of disclosure involved in this specification also includes technical solutions formed by the above-mentioned features and the technical features disclosed in this specification (but not limited to) with similar functions being replaced with each other.

In addition, although operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, which should not be construed as limiting the scope of the present disclosure. Features that are described in the context of separate embodiments may be implemented in combination in a single embodiment. Conversely, various features described in the context of a single embodiment may also be implemented in multiple embodiments separately or in any suitable sub-combination.

Although the subject matter has been described in languages specific to structural features and/or logical operations of the method, it should be understood that the subject matter defined in the appended claims is unnecessarily limited to the specific features or operations described above. The specific features and operations described above are merely illustrative forms of implementing the claims.

The invention claimed is:

1. A method for performing special effect processing on images, comprising:
   acquiring a video, wherein the video is inputted in real time or pre-stored in a mobile or desktop terminal;
   capturing an image from the video by an image capture unit of a rendering layer of the mobile or desktop terminal when playing the video, and storing the captured image in a data storage layer;
   acquiring a plurality of images from the data storage layer by an image acquisition unit of the rendering layer of the mobile or desktop terminal;
   performing split-screen processing on the plurality of images by a special effect unit of the rendering layer of the mobile or desktop terminal, wherein the performing split-screen processing on the plurality of images by a special effect unit of the rendering layer of the mobile or desktop terminal further comprises dividing a blank image into regions according to a number of the plurality of images, wherein the plurality of images are drawn in respective regions of the blank image based on a time sequence of the plurality of images and then combined into an image; and
   outputting the image and displaying the image on a terminal screen.

2. The method according to claim 1, wherein the acquiring a plurality of images from the data storage layer by an image acquisition unit of the rendering layer comprises:
   acquiring, by the image acquisition unit of the rendering layer, k images at a time interval of n from a cache with a total capacity of k*n in the data storage layer, wherein k is a positive integer greater than 1, and n is a positive integer.

3. The method according to claim 1, further comprising: sending an image acquisition instruction to the image acquisition unit of the rendering layer via a script layer, to trigger the image acquisition unit.

4. The method according to claim 1, further comprising: sending a control instruction to the special effect unit of the rendering layer via the script layer, to trigger the special effect unit.

5. The method according to claim 1, further comprising: sending an image capture instruction to the image capture unit of the rendering layer via the script layer, to trigger the image capture unit.

6. The method according to claim 5, wherein the image capture instruction comprises at least one of the following parameters: an image identification, image coordinates, an image width, an image height, resolution of the terminal screen, and the number of split screens.

7. A device for performing special effect processing on images, comprising:
   a memory configured to store non-transitory computer-readable instructions; and
   a processor configured to execute the computer-readable instructions to implement operations comprising:
   acquiring a video, wherein the video is inputted in real time or pre-stored in a mobile or desktop terminal;
   capturing an image from the video via an image capture unit of a rendering layer of the mobile or desktop terminal when the video is played, and store the captured image in a data storage layer;
   acquiring a plurality of images from the data storage layer via an image acquisition unit of the rendering layer of the mobile or desktop terminal;
   performing split-screen processing on the plurality of images via a special effect unit of the rendering layer of the mobile or desktop terminal, wherein the performing split-screen processing on the plurality of images by a special effect unit of the rendering layer of the mobile or desktop terminal further comprises dividing a blank image into regions according to a number of the plurality of images, wherein the plurality of images are drawn in respective regions of the blank image based on a time sequence of the plurality of images and then combined into an image; and
   outputting the image and displaying the image on a terminal screen.

8. A non-transitory computer-readable storage medium, configured to store non-transitory computer-readable instructions that, when being executed by a computer, cause the computer to implement operations comprising:
   acquiring a video, wherein the video is inputted in real time or pre-stored in a mobile or desktop terminal;

capturing an image from the video by an image capture unit of a rendering layer of the mobile or desktop terminal when playing the video, and storing the captured image in a data storage layer;

acquiring a plurality of images from the data storage layer by an image acquisition unit of the rendering layer of the mobile or desktop terminal;

performing split-screen processing on the plurality of images by a special effect unit of the rendering layer of the mobile or desktop terminal, wherein the performing split-screen processing on the plurality of images by a special effect unit of the rendering layer of the mobile or desktop terminal further comprises dividing a blank image into regions according to a number of the plurality of images, wherein the plurality of images are drawn in respective regions of the blank image based on a time sequence of the plurality of images and then combined into an image; and outputting the image and displaying the image on a terminal screen.

9. The device according to claim 7, wherein the processor configured to execute the computer-readable instructions to implement an operation comprising:

acquiring, by the image acquisition unit of the rendering layer, k images at a time interval of n from a cache with a total capacity of k*n in the data storage layer, wherein k is a positive integer greater than 1, and n is a positive integer.

10. The device according to claim 7, wherein the processor configured to execute the computer-readable instructions to implement an operation comprising:

sending an image acquisition instruction to the image acquisition unit of the rendering layer via a script layer, to trigger the image acquisition unit.

11. The device according to claim 7, wherein the processor configured to execute the computer-readable instructions to implement an operation comprising:

sending a control instruction to the special effect unit of the rendering layer via the script layer, to trigger the special effect unit.

12. The device according to claim 7, wherein the processor configured to execute the computer-readable instructions to implement an operation comprising:

sending an image capture instruction to the image capture unit of the rendering layer via the script layer, to trigger the image capture unit.

13. The device according to claim 12, wherein the image capture instruction comprises at least one of the following parameters: an image identification, image coordinates, an image width, an image height, resolution of the terminal screen, and the number of split screens.

* * * * *